United States Patent [19]

Pinnow et al.

[11] Patent Number: 4,768,274

[45] Date of Patent: Sep. 6, 1988

[54] METHOD FOR CONVERTING PASSENGER VEHICLES WITH INDEPENDENT REAR SUSPENSION TO A FUNERAL COACH

[75] Inventors: Norm Pinnow; Frank W. Norris, Jr.; Ronald Benedict, all of Lima, Ohio

[73] Assignee: Superior Coaches, Lima, Ohio

[21] Appl. No.: 31,085

[22] Filed: Mar. 26, 1987

[51] Int. Cl.⁴ .............................................. B23P 17/04
[52] U.S. Cl. ................................ 29/401.1; 29/402.03; 29/426.4
[58] Field of Search ............. 29/401.1, 402.03, 402.08, 29/426.4, 426.2; 280/661, 668; 296/198, 195

[56] References Cited

U.S. PATENT DOCUMENTS

| | | | |
|---|---|---|---|
| 1,128,770 | 2/1915 | Gilliland | 280/668 X |
| 4,342,146 | 8/1982 | Hanson | 29/401.1 X |
| 4,567,637 | 2/1986 | Pees et al. | 29/401.1 X |

Primary Examiner—P. W. Echols
Assistant Examiner—Joseph M. Gorski
Attorney, Agent, or Firm—Pravel, Gambrell, Hewitt, Kimball & Krieger

[57] ABSTRACT

A method for converting a passenger vehicle includes a reconstruction of the vehicle rear independent suspension assemblies wherein a pair of rear struts are repositioned increasing the angle of inclination of each rear strut by moving the upper end portion of the strut away from the central portion of the vehicle to thereby increase the spacing between the upper ends of the struts and thus increase lateral load carrying capability of the vehicle.

5 Claims, 3 Drawing Sheets

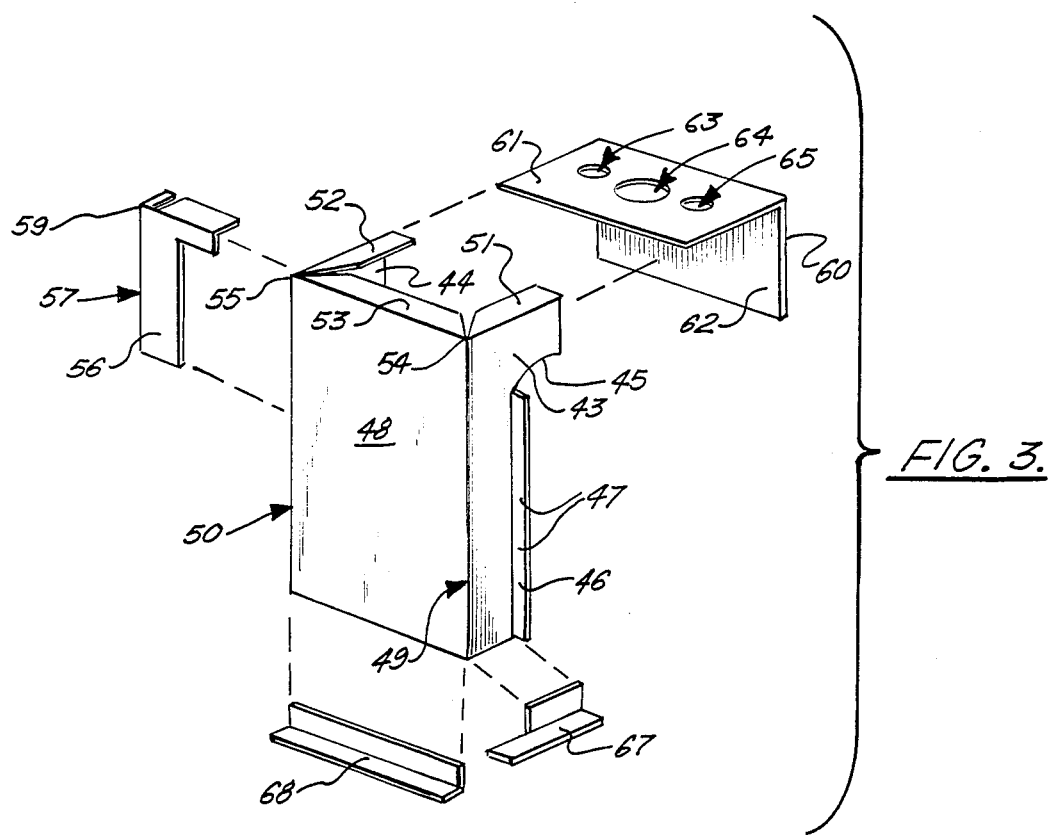
FIG. 3.
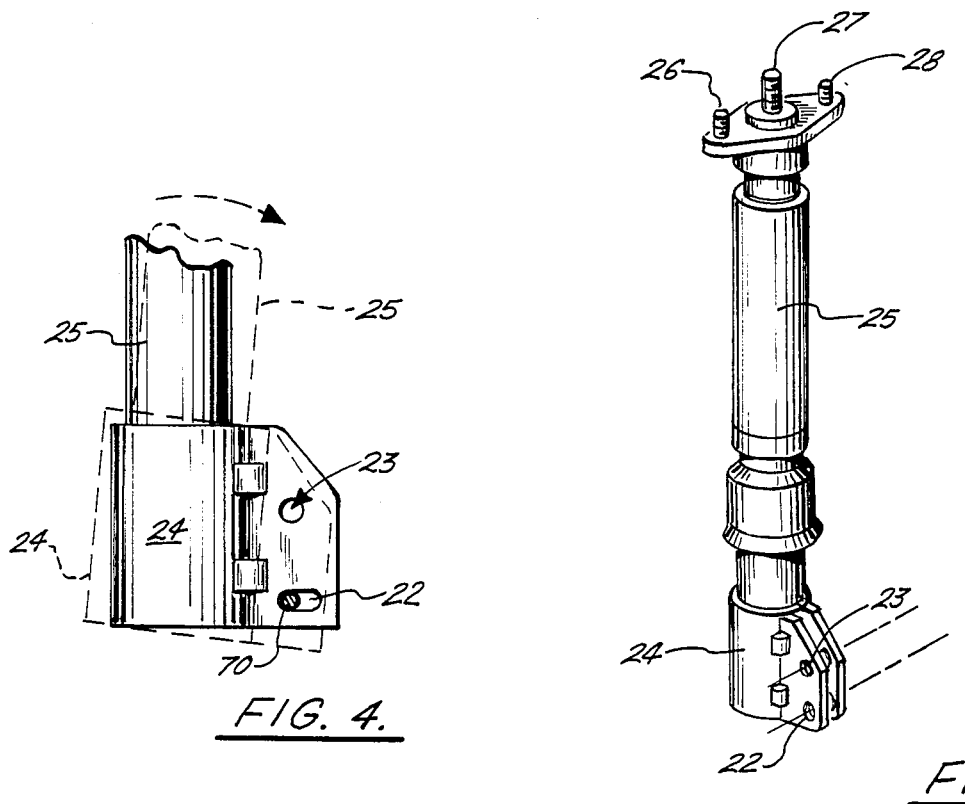
FIG. 4.
FIG. 5.

METHOD FOR CONVERTING PASSENGER VEHICLES WITH INDEPENDENT REAR SUSPENSION TO A FUNERAL COACH

BACKGROUND OF THE INVENTION

The present invention relates to vehicle conversions and more particularly relates to a method for converting an automobile or vehicle body having independent rear suspension to a funeral coach vehicle having a loadbed for carrying caskets that is positioned generally between the rear strut support of the independent rear suspension.

In the automotive industry, it is common to convert a typical four-door passenger vehicle having front and rear seats and a rear trunk area into a number of other specialty vehicles such as a funeral coach, for example. In the conversion of a passenger vehicle to a funeral coach, the rear trunk area of the vehicle must be removed and an elongated structural loadbed is provided for carrying caskets. The exterior of the vehicle is covered with the "coach" portion of the vehicle by knocking out the rear window of the vehicle and extending the roof line rearwardly.

Currently, many automobiles are manufactured with an independent wheel suspension that includes an elongated strut as part of the suspension and a shock or strut tower which forms a portion of the automobile vehicle body. The shock tower or strut tower as it is called extends into the trunk of a typical passenger automobile occupying some of the cargo space within the trunk, but otherwise not interfering with the operation of the trunk. Items can be placed in the trunk of a passenger vehicle on the sides of and around the shock tower with little or no problem. Since the automobile strut typically inclines toward the center of the vehicle, the shock tower not only extends upwardly into the trunk but laterally into the trunk as well.

While the use of independent wheel suspension struts and shock towers does not interfere with the operation of a typical four-door passenger automobile, it presents problems in converting such a passenger vehicle to such a specialty vehicle as a funeral coach. The shock towers extending inwardly and upwardly from the wheel well create a space problem when the rear area of the vehicle is to function as a load carrying surface for caskets. The shock towers can restrict the width of a casket that can be placed in the rear of the coach, and make loading and unloading of caskets difficult.

Several patents relate generally to vehicle conversions and more particularly shock tower constructions. For example, U.S. Pat. No. 4,408,794 entitled "Support Column For Automobile Wheel Suspension Assembly" issued to H. Harasaki describes a support column provided in an automobile body structure for accommodating a rear wheel suspension assembly that comprises a column support structure rigidly mounted on an apron forming a part of the body structure and defining a wheel housing. The column structure is also rigidly connected to an inner panel of the body structure and projects generally upwardly from the apron for accommodating the wheel suspension assembly having one end connected to and supported by a supported plate. The support plate has a bracket portion to which one end of the suspension assembly is connected and a brace portion extending downwardly towards the inner panel. The suspension assembly is inclined inwardly toward the central portion of the vehicle body.

A "Vehicle Wheel Alignment Adjustment Device" is described in the Wilkerson U.S. Pat. No. 4,213,631. The adjustment assembly allows independent or simultaneous changing of caster and camber angles of the front wheels of a vehicle having a single axis suspension device such as the MacPherson Strut, between the lower control arm and the upper control bracket that uses circular plates that may be fixed to the upper control bracket in any of four 90 degree angularly related positions with an eccentric aperture for laterally supporting the strut in numerous angular positions to vary the wheel spindle's caster and camber angles independently or simultaneously as desired.

The Wessells U.S. Pat. No. 3,596,978 entitled "Combined A-Post, Cowl and Wheelhouse Structure" discloses a motor vehicle structure which provides for a more shallow A-post structure and a reinforced inner wheel housing panel for joining the A-post and transferring loading and shock stresses from the wheels or front end to the A-post. The dash panel, cowl, inner wheel housing and A-post structure form an open box structure across the front of the passenger compartment.

The Fledler et al. U.S. Pat. No. 4,042,259 entitled "Suspension Strut Assemblies For Motor Vehicles Suspensions" shows a typical prior art suspension strut assembly for a motor vehicle suspension including a telescopic damper which is connected at its ends to a wheel carrier and to part of the vehicle superstructure. and a wheel suspension spring which surrounds the damper and is seated at one end on a casing portion of the damper and at the other end effectively on a piston rod of the damper.

A British Pat. No. 777,551 entitled "Floor Structure For Chassisless Motor Vehicle" provides a structure affording an increased stiffness against longitudinal as well as transverse stresses for a vehicle adjacent a front wheel suspension system having a separately stamped body and including lateral and top walls.

While several of these patents relate generally to suspension assemblies and independent wheel suspensions as well as suspension strut assemblies, none relate to a conversion which method includes increasing the angle of inclination of the strut assembly to solve the problem of converting an independent wheel suspension vehicle using a suspension strut assembly to a specialty vehicle, namely a funeral coach so that the load carrying portion of the vehicle is enlarged to accommodate wider loads within the vehicle's coach compartment, yet not interfering with normal operation of the vehicle.

In that regard, the present invention solves the prior art problem of converting a passenger vehicle with an independent rear suspension to a funeral coach vehicle without unduly restricting the lateral space available for carrying caskets at the rear or coach portion of the vehicle.

The method of the present invention converts a passenger vehicle with an independent rear suspension that includes a pair of rear struts and a rear strut support tower to a funeral coach vehicle having a loadbed for carrying caskets that is positioned generally between the rear strut support towers. In the method of the present invention, the vehicle rear strut towers are removed so that the position of each strut upper end can be changed. The angle of inclination of each rear strut is increased by moving the upper end portion of each strut away from the central portion of the vehicle thereby increasing the spacing between the upper ends of each support. The upper ends of each respective strut are then supported with a pair of replacement towers having a lateral spacing that is larger than the lateral spacing of the original passenger vehicle strut towers.

The distance between each rear wheel and its strut is increased using a spacer between the wheel and the strut. In the preferred method, the innermost wall of each replacement strut tower is flattened so that flattened vertical surfaces, generally parallel to each other, are provided on each respective rear strut tower. The strut angle of inclination is preferably increased by an angular amount of five degrees (5°). With the present invention, the lower end portion of the struts are preferably maintained in the same lateral position as the strut angles are increased as part of the conversion methods.

BRIEF DESCRIPTION OF THE DRAWINGS

A better understanding of the invention can be had when the detailed description of a preferred embodiment set forth below is considered in conjunction with the drawings, in which:

FIG. 3 is an exploded perspective view of the replacement shock tower which is part of the method of the present invention;

FIG. 4 is a fragmentary view of the lower end portion of the suspension strut illustrating the lower end portion thereof with the different angular positions as a result of the conversion method of the present invention;

FIG. 5 is a perspective view of a conventional suspension strut as used with the method of the present invention.

DETAILED DESCRIPTION OF A PREFERRED EMBODIMENT

Figure 1:
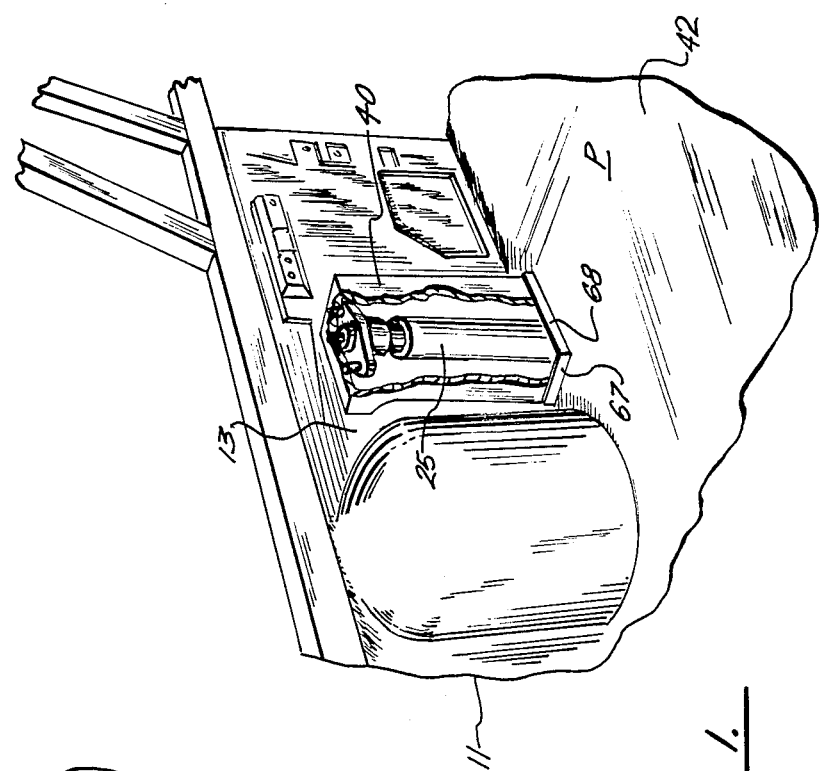
FIG. 1 is a partial perspective view of a passenger vehicle illustrating the rear strut tower prior to removal as part of the method of the present invention.
Figure 2:
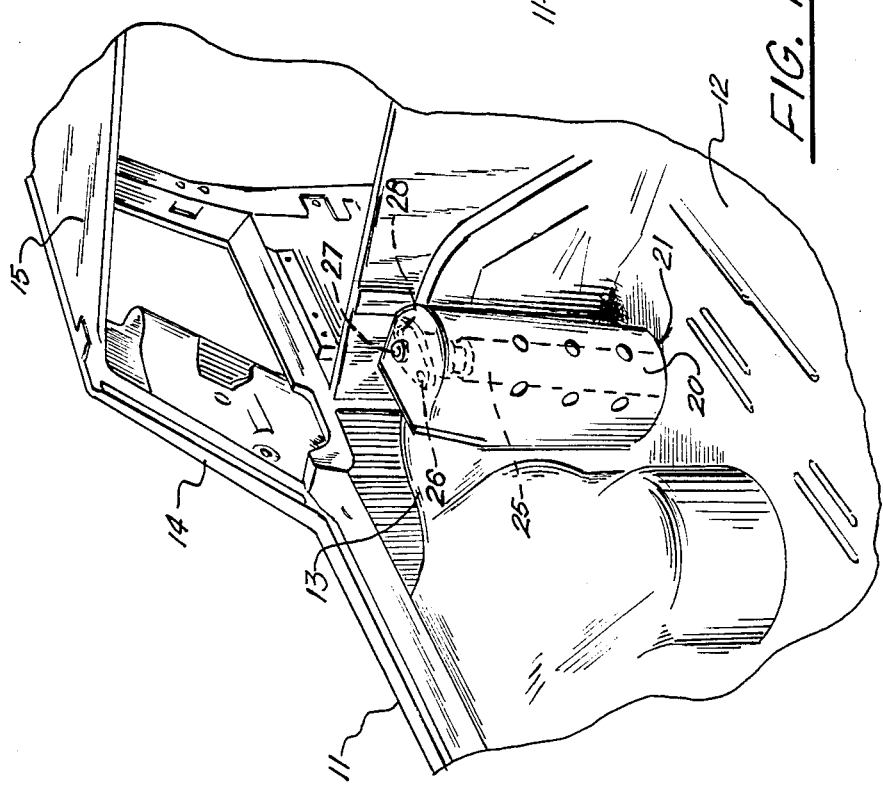
FIG. 2 in a partial perspective view of the method of the present invention illustrating the replacement strut tower and the upper end portion of the vehicle strut.
Figure 6:
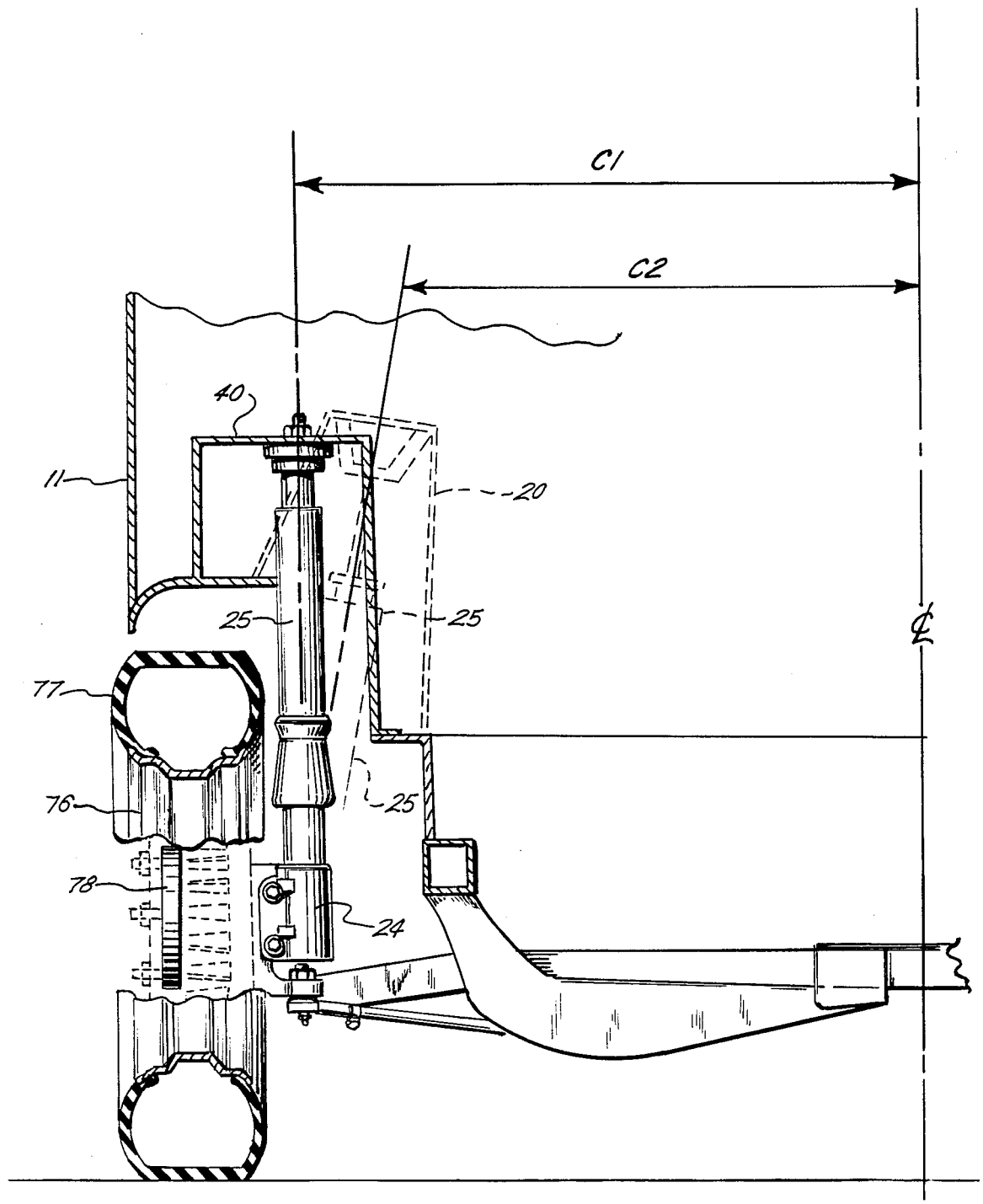
FIG. 6 is a sectional elevational view of the preferred embodiment of the apparatus of the present invention illustrating the initial and replacement positions of the rear shock tower and strut for the left side of the vehicle.

FIGS. 1-6 show the method and apparatus of the present invention. In FIG. 1, the existing strut or shock tower of a vehicle is shown while FIG. 2 shows the strut or tower installed according to the method of the present invention. FIG. 6 shows the change in position of the vehicle rear strut or shock while FIGS. 3-5 illustrate the strut or shock tower construction.

In FIG. 1, a fragmentary view shows a vehicle body 11 (and more particularly the left rear body area) including the vehicle floor pan 12, left rear side fender well 13, left rear roof pillar 14, roof panel 15, and rear seat support 16. Shock or strut tower 20 is shown as welded to wheel well 13 and floor pan 12. The lower portion 21 of shock tower 20 is peripherally joined to floor pan 12. However, the shock tower 20 itself is generally cylindrical and hollow, having an open bottom so that a shock or strut 25 can fit within the tower 20, as shown in FIG. 1, phantom lines. The shock tower 20, shock or strut 25 and vehicle body are conventional, and relate to a vehicle of unibody construction, having independent wheel suspension. The upper end of strut 25 has stud bolts 26-28 that form a connection with the vehicle shock tower.

An exemplary vehicle having the construction of FIG. 1 would be the General Motors Corporation Cadillac "C" car, known by the General Motors Corporation trademark designation, "Cadillac Sedan DeVille," a front wheel drive, independent wheel suspension vehicle with unibody construction. Such vehicles are desirable inter alia for conversion to funeral coaches because of their elegance, fit and finish, interior appointments, as well as performance and ride. However, the conversion of such a vehicle to a funeral coach is a problem requiring both body and interior modifications as well as some changes in suspension, primarily because of changes in load capacity associated with the carrying of caskets.

The typical conversion of a passenger sedan vehicle to a funeral coach envisions a reconstruction of the rear vehicle body and usually a lengthening of the wheel base. A welded steel coach is constructed aft, by removing the passenger vehicle trunk and rear seat areas, while the interior of the vehicle behind the driver's seat is equipped with a flat, elongated load platform receptive of the casket. The vehilce body and wheel base can be elongated by simply cutting the vehicle in half while it rests upon a precise, yet structurally supportive jig. The parted vehicle sections are then spaced and new body parts added to give the vehicle a desired increased wheel base. Rear shocks are typically stiffened to accommodate the extra weight of the added body parts, coach work, load platform, structural reinforcing and casket. This procedure of conversion from a passenger sedan to a funeral coach is well known in the art. However, a problem exists in transforming independent wheel suspension vehicles to funeral coaches because such vehicles have high, upwardly extending shock or strut towers which can interfere with the loading of a casket into the aft area of the vehicle.

In FIG. 2, the vehicle body 11 is shown with the conversion method of the present invention completed, the new shock tower in position and designed by the numeral 40. The floor pan 12 has been replaced with a load platform 42 for carrying thereon a casket.

FIGS. 3-5 illustrate more particularly the construction of shock or strut tower 40. Tower 40 includes a pair of spaced apart vertical right and left side panels 43, 44 which are identical, mirror images. Each side panel has a curved inner edge 45 that conforms to the vehicle wheel well 13 when the tower is installed. Flange 46 extends laterally from edge 45, providing a flat surface which abuts wheel well 13. Flange 46 is typically welded along its edge 47 to the wheel well 13. It should be understood that each side panel 43, 44 has a flange 46. Shock tower 40 also includes front panel 48 integrally connected at edges 49, 50 respectively to side panels 43, 44. Horizontal flanges 51-53 are integrally connected to side panels 43, 44 and front panel 48. Corners 54, 55 of shock tower 40 can be reinforced with brackets 56, only one such bracket being shown in the drawings. Edge 57 of bracket 56 aligns with edge 50, and flange 58 of bracket 56 registers with flange 53 of front panel 48. Corner 59 of bracket 56 registers with corner 55 upon assembly. Final assembly is of welded steel or welded aluminum construction, for example. Shock tower cap 60 is an ell-shape, having intersecting flanges 61, 62. Flange 61 has a shape that corresponds to the top of shock tower 40 as defined by the flanges 51-53. Flange 62 registers with side panels 43, 44 and is preferably welded thereto. Angle members 67, 68 can be used to form a structural interface between tower 40 and the vehicle body 12. The angles 67, 68 could face either inwardly as shown in FIG. 2, or outwardly as shown in FIG. 3.

A plurality of openings 63-65 is formed in the flange 61. Openings 63-65 are receptive of stud bolts 26-28 of strut 25.

FIGS. 4-5 illustrate strut 25 which is conventional and a part of the vehicle as manufactured. However, in accordance with the method of the present invention modifications are made to strut 25. Specifically, strut 25 has a lower end portion 24 with a pair of openings 22, 23 which are receptive of assembly bolts that form a part of the strut and wheel assembly. The upper opening 23 defines the pivot about which the strut 25 is rotated when the strut angle of inclination is increased in accordance with the present invention. Since strut 25 rotates about upper opening 23 as a pivot, lower opening 22 is modified to be an elongated slot (FIG. 4). In FIG. 4, the original position (hard lines) and final position (phantom lines) of strut lower end 24 are shown. Notice that bolt 70 occupies the same position, but the strut 24 lower end position changes. Bolt 70 merely occupies a different position in the slot based upon the change in inclination of strut 25. In actual practice, the slot could be a repositioned circular opening on a newly manufactured strut 25. However, it is preferable to enlarge the existing lower opening to the form of slot 22.

FIG. 6 schematically illustrates the method of the present invention. Though the left rear shock is shown in FIG. 6, the right rear shock is a mirror image of FIG. 6. The angle of inclination of the left and right rear struts 25 are increased so that the top of each strut 26 moves from a first position represented by the dimension line C2 to a second position represented by the dimension line C1 as referenced from the vehicle centerline 75. This increase in lateral clearance from C2 to C1 is achieved by pivoting the shock 25 about opening 23 and by repositioning the shock tower as aforedescribed. The lower end 24 of each strut thus stays in approximately the same lateral position after the repositioning. The savings in lateral space translates directly to increase load carrying capability for vehicles such as a funeral coach. In FIG. 6, the vehicle rear wheel 76, tire 77, and hub 78 are shown schematically. The bottom of shock 25 is pivotally mounted to the vehicle strut assembly which is not shown in detail since these parts are conventional and since the strut 25 connection at its lower end through openings 22, 23 does not change, but only pivots as shown in FIG. 4. The increase in angular orientation of the strut is preferably greater than five degrees (5°). In FIG. 6, the final strut 25 angular position is preferably slightly less than ninety degree (90°). A platform "P" in FIG. 6 represents the load carrying surface upon which caskets are placed.

The foregoing description of the invention is illustrative and explanatory thereof, and various changes in the size, shape and materials, as well as in the details of the illustrated construction may be made without departing from the spirit of the invention.

What is claimed as invention is:

1. A method of converting a passenger vehicle with an independent rear suspension that includes a pair of rear struts connected at the upper end portion of each strut to a corresponding pair of original rear strut support towers, to a funeral coach vehicle, comprising the steps of:
    (a) forming modified strut towers by moving at least a portion of each of the passenger vehicle original rear strut towers from its original position so that the position of each strut upper end can be changed from an initial lateral spacing defined by the distance between the upper end portions of the original strut towers;
    (b) increasing the strut tower lateral spacing, thereby forming a modified lateral spacing larger than the intial lateral spacing;
    (c) increasing the angle of inclination with respect to horizontal of each rear strut by moving the upper end portion of each strut laterally away from a center portion of the vehicle, thereby increasing the spacing between the upper ends of each strut;
    (d) supporting the respective upper end portion of the pair of struts at the increased angle of inclination respectively with said pair of modified strut towers having the modified lateral spacing therebetween that is larger than the initial lateral spacing; and
    (e) forming a load carrying platform generally between the modified strut towers.

2. The method of claim 1, wherein there is further provided the step of forming an innermost wall of each respective modified strut tower with respective flattened vertical surfaces that are generally parallel.

3. The method of claim 1 wherein in step (b), the angle of inclination is increased by at least five degrees.

4. The method of claim 1 wherein in step (b), the angle of inclination is increased to an angle of slightly less than ninety degrees.

5. The method of claim 1, wherein in step (a), the original strut towers are completely removed and new strut towers installed at the modified lateral spacing.

* * * * *